US006810732B2

(12) United States Patent
Shon

(10) Patent No.: US 6,810,732 B2
(45) Date of Patent: Nov. 2, 2004

(54) WATER LEVEL SENSOR

(75) Inventor: Jong-Chull Shon, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/967,933

(22) Filed: Oct. 2, 2001

(65) Prior Publication Data

US 2003/0010117 A1 Jan. 16, 2003

(30) Foreign Application Priority Data

Jul. 13, 2001 (KR) ........................................ 2001-42375

(51) Int. Cl.[7] ............................................. G01F 23/00
(52) U.S. Cl. .................. 73/304 R; 73/304 C; 73/290 R
(58) Field of Search .......................... 73/304 R, 304 C, 73/290 R

(56) References Cited

U.S. PATENT DOCUMENTS

| | | | |
|---|---|---|---|
| 3,515,000 A | * 6/1970 | Baumoel ................... 73/304 R |
| 4,010,650 A | * 3/1977 | Piatkowski, Jr. ........... 73/304 C |
| 4,204,427 A | * 5/1980 | Gothe et al. .............. 73/304 C |
| 5,052,223 A | * 10/1991 | Regnault et al. .......... 73/304 C |
| 5,172,332 A | * 12/1992 | Hungerford et al. ........ 700/267 |
| 5,477,727 A | * 12/1995 | Koga ....................... 73/304 C |
| 6,053,042 A | 4/2000 | Hwang et al. ................ 73/290 |

* cited by examiner

*Primary Examiner*—Helen Kwok
*Assistant Examiner*—Rodney Frank
(74) *Attorney, Agent, or Firm*—Robert E. Bushnell, Esq.

(57) ABSTRACT

Disclosed herein is a water level sensor. The water level sensor includes a reference electrode comprised of a plurality of electrode plates to detect electric conductivity of water filling a space between the electrode plates of the reference electrode. A measuring electrode is comprised of a plurality of electrode plates, which are extended along a length of a water tub to be longer than the electrode plates of the reference electrode and spaced apart from the electrode plates of the reference electrode to detect electric conductivity of water filling a space between the electrode plates of the measuring electrode.

22 Claims, 6 Drawing Sheets

WATER LEVEL SENSOR

CLAIM OF PRIORITY

This application makes reference to, incorporates the same herein, and claims all benefits accruing under 35 U.S.C. §119 from an application for SENSOR FOR DETECTING WATER LEVEL earlier filed in the Korean Industrial Property Office on Jul. 13, 2001 and there duly assigned Serial No. 2001-42375.

BACKGROUND OF THE INVENTION

1. Field of the Invention

The present invention relates generally to water level sensors, and more particularly to a water level sensor for sensing water levels by detecting the electric conductivity of water using reference and measuring electrodes.

2. Description of the Prior Art

In general, a water level sensor used for washing machines serves to sense the water levels of washing water supplied to the water tub of a washing machine. In most cases, the water levels are sensed using a mechanical switch or LC oscillation technique.

Of those methods, the LC oscillation technique, as shown in FIG. 1, is performed in such a manner that a water level sensor is positioned in the space between a water tub 1 and a spin-drying tub 2, a water level sensor generates a water level signal corresponding to the variation of air pressure according to the amount of washing water and inputs the signal to a microprocessor, and the microprocessor senses the water level of the washing water on the basis on a water level detection signal.

However, the water level sensor employing the mechanical switch fails to precisely measure the water level of washing water since the water level is measured on the basis of water pressure generated by washing water supplied to the water tub. The water level sensor employing the LC oscillation technique fails to precisely measure the water level of washing water because of errors due to the variations of an outdoor temperature and long-term wear and tear.

SUMMARY OF THE INVENTION

Accordingly, the present invention has been made keeping in mind the above problems occurring in the prior art, and an object of the present invention is to provide a water level sensor that is capable of detecting water levels using reference and measuring electrodes embedded in a water tub.

In order to accomplish the above object, the present invention provides a water level sensor for measuring a water level of a water tub, comprising: a reference electrode comprised of a plurality of electrode plates to detect electric conductivity of water filling a space between the electrode plates of the reference electrode; and a measuring electrode comprised of a plurality of electrode plates extended along a length of the water tub to be longer than the electrode plates of the reference electrode and spaced apart from the electrode plates of the reference electrode to detect electric conductivity of water filling a space between the electrode plates of the measuring electrode.

Preferably, the reference electrode may provide a detection value as a reference value for water level detection, the measuring electrode provides another detection value as a measured value corresponding to a contact area between water and the electrodes varying according to water levels, and the water level is calculated by a difference between the reference and measured values.

Preferably, the electrodes may be embedded in the water tub to allow the surfaces thereof to be exposed to the interior of the water tub.

Preferably, the electrodes may be plated with metal to form metallic coatings on the surfaces thereof.

Preferably, the water level sensor may be applied to a washing machine, water purifier or humidifier.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Hereinafter, a water level sensor in accordance with a preferred embodiment of the present invention is described in detail with reference to accompanying drawings.

Figure 1:
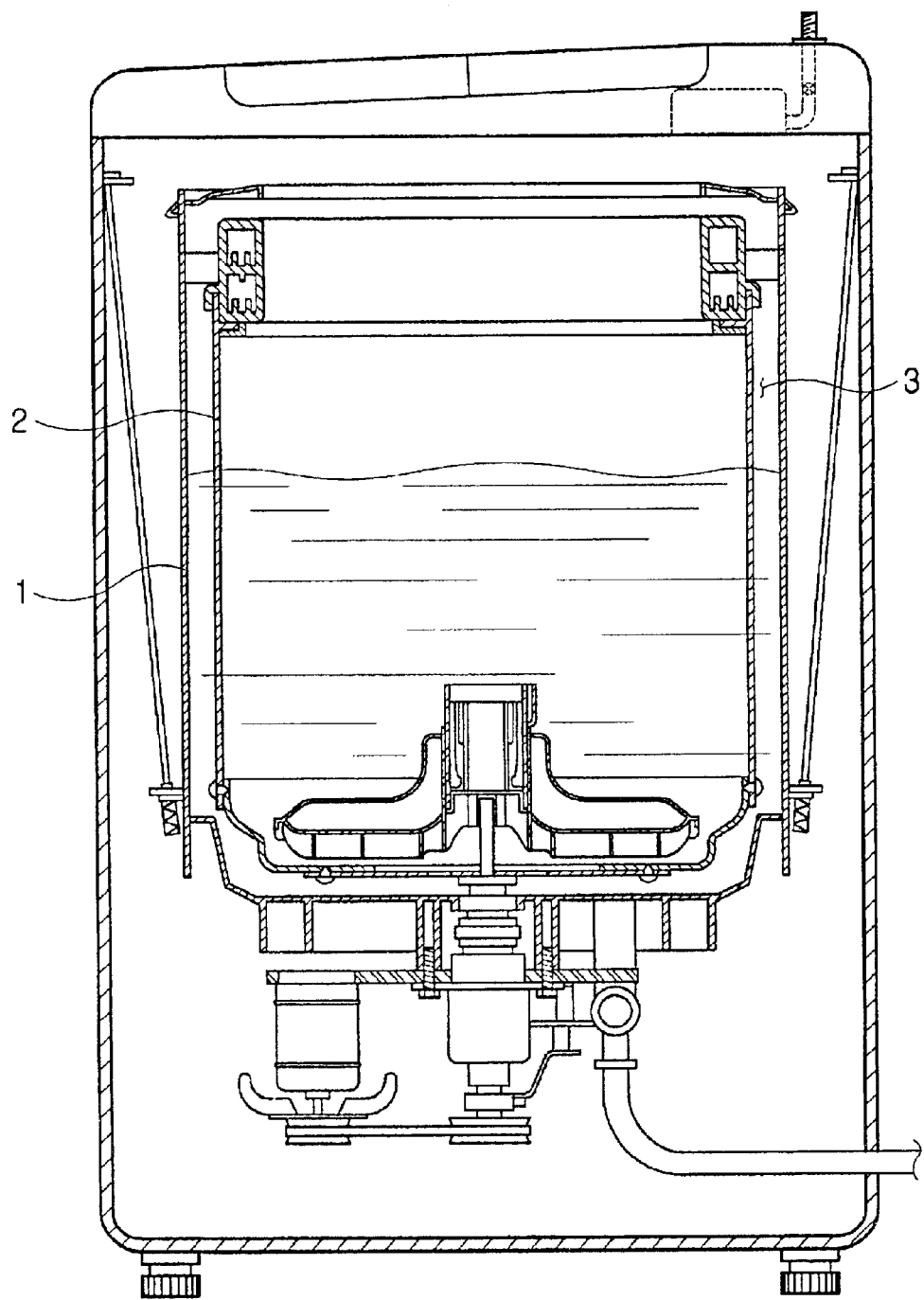
FIG. 1 is a longitudinal cross section showing a general washing machine.
Figure 2:
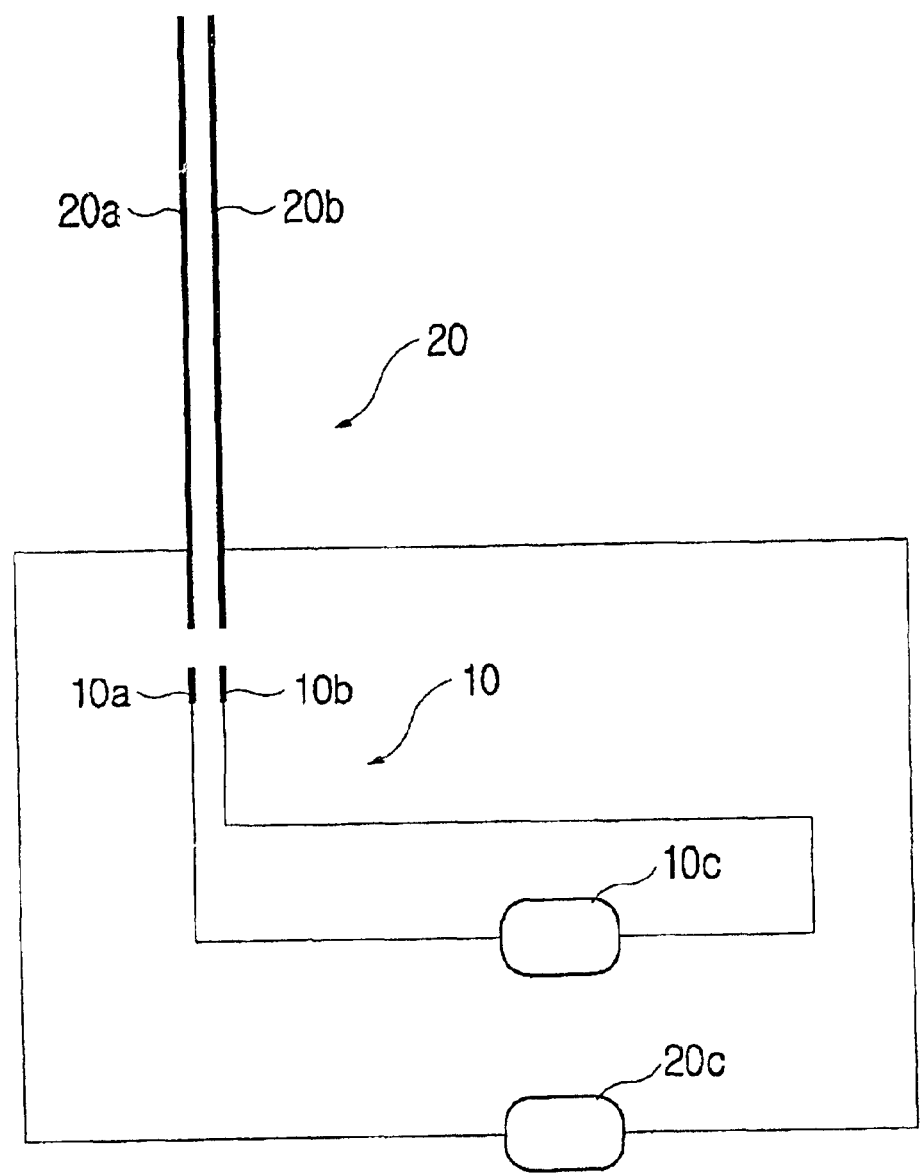
FIG. 2 is a diagram showing the construction of a water level sensor in accordance with the present invention.
Figure 3A:
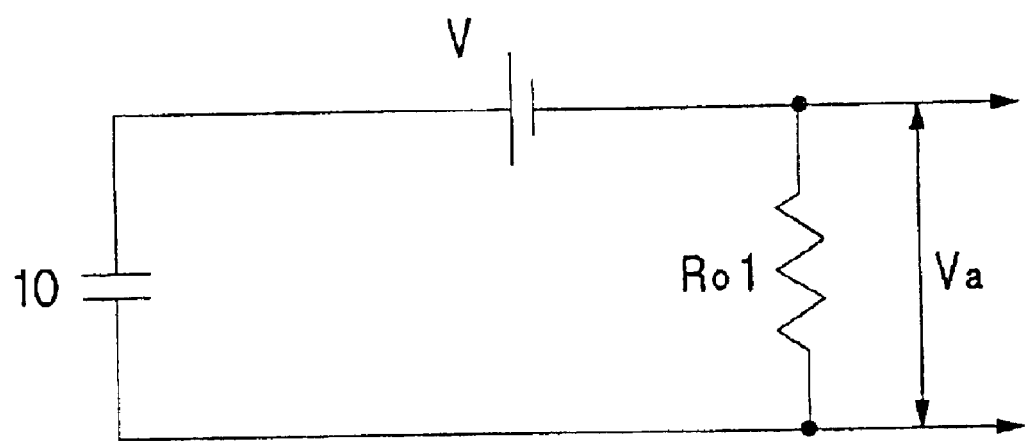
FIGS. 3a and 3b are circuit diagrams showing the measuring operations of the reference and measuring electrodes of the water level sensor of the present invention.
Figure 3B:
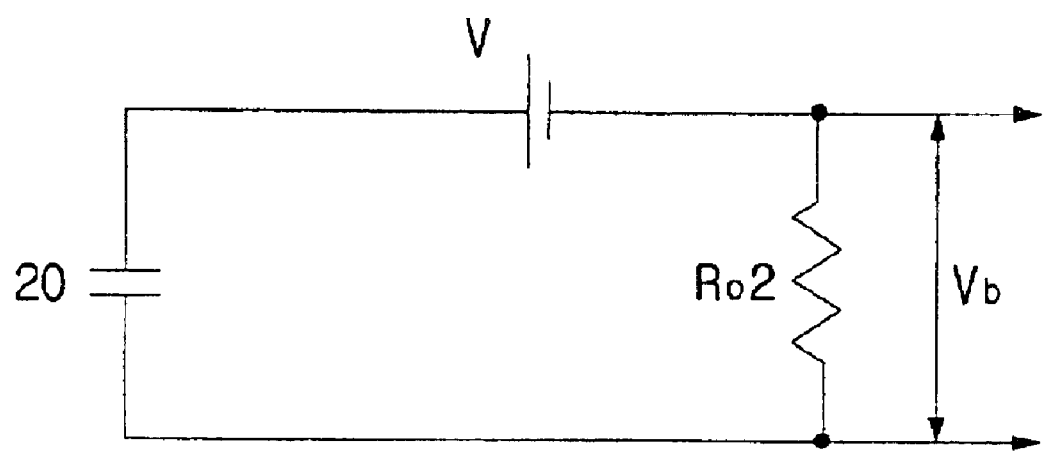

FIG. 2 is a schematic diagram showing the construction of the water level sensor of the present invention. FIGS. 3a and 3b are circuit diagrams showing the measuring operations of the reference and measuring electrodes of the water level sensor of the present invention.

As illustrated in the drawings, the water level sensor of the present invention includes a reference electrode 10 and a measuring electrode 20. The reference electrode 10 consists of two electrode plates 10a and 10b spaced apart from each other. The measuring electrode 20 consists of two electrode plates 20a and 20b spaced apart from each other and extended to be longer than the electrode plates 10a and 10b of the reference electrode 10.

The reference electrode 10 further includes an output circuit 10c electrically connected to the electrode plates 10a and 10b, and constitutes a closed circuit, together with the electrode plates 10a and 10b. The measuring electrode 20 further includes an output circuit 20c electrically connected to the electrode plates 20a and 20b, and constitutes a closed circuit, together with the electrode plates 20a and 20b.

The output circuits 10c and 20c each serve to supply predetermined direct currents to two corresponding electrode plates 10a and 10b or 20a and 20b, and to input the output signal corresponding to the electric conductivity of water filling the space between two electrode plates 20a and 20b to a microprocessor (not shown).

Hereinafter, the operation of the water level sensor of the present invention is described in detail.

The electric conductivity of water ($\sigma=S/l$) is in reverse proportion to the length $l$ of an electrode but in proportion to a contact area (S) between water and electrode plates. Accordingly, when the contact area is enlarged as the amount of water supplied to a water tub is increased, the electric conductivity of water is proportionally increased. Thereafter, the electric conductivity of water is converted into voltages, the voltages are output to the microprocessor, and a water level can be calculated by the microprocessor on the basis of the voltages.

The electric conductivity of water is affected by the turbidity of water, so there may occur errors in which a detected water level is different from an actual water level when the detected water level is obtained on the basis of only the contact area between water and the electrode plates. Accordingly, the water level should be measured in consideration of the turbidity of water, together with the contact area.

For this reason, there is employed a measuring method in which a water level is measured using the difference between the detected values of the reference and measuring electrodes 10 and 20.

The electric conductivity of water ($\sigma=kS/l$) is in reverse proportion to the length $l$ of an electrode but in proportion to a contact area (S) between water and electrode plates. Accordingly, when the contact area is enlarged as the amount of water supplied to a water tub is increased, the electric conductivity of water is proportionally increased. Thereafter, the electric conductivity of water is converted into voltages, the voltages are output to the microprocessor, and a water level can be calculated by the microprocessor on the basis of the voltages.

The measuring electrode 20 is longer than the reference electrode 10, and extended from a lower position of the water tub to a upper position of the water tub in consideration of a measuring range from a relatively low water level to a relatively high water level. That is, the measuring electrode 20 is mounted to allow the contact area between water and the electrode plates 20a and 20b to be varied according to a water level.

The reference electrode 10 is positioned in the lower portion of the water tub and submerged under water, so the contact area between water and the electrode plates 10a and 10b is not varied according to a water level and is kept constant. In contrast, for the measuring electrode 20, the contact area between water and the electrode plates 20a and 20b is varied according to the amount of water supplied to the water tub.

Referring to FIG. 3a, there is illustrated the circuit in which a predetermined direct current source V is applied to the reference electrode 10 from the output circuit 10c to detect the electric conductivity of water. In order to do so, a direct voltage voltage drop $V_{x1}$ occurs across the electrode 10 based on the conductivity of the water. By Kirchhoff's voltage law, $Va=V-V_{x1}$. In this case, the voltage across resistor Ro1 of the output circuit 10c is varied according to the electric conductivity of water filling the space between the electrode plates 10a and 10b, voltages Va corresponding to the voltage across resistor Ro1 are output to the microprocessor, and the microprocessor receives the voltages Va and calculates the electric conductivity of water. Even though the amount of water supplied to the water tub is varied while the electrode plates 10a and 10b are submerged under water, the contact area is not changed, and so constant voltages are applied to the microprocessor.

Referring to FIG. 3b, there is illustrated the circuit in which a predetermined direct current source V is applied to the measuring electrode 20 from the output circuit 20c to detect the electric conductivity of water. In this case, the voltage across resistor Ro2 of the output circuit 20c is varied according to the electric conductivity of water filling the space between the electrode plates 20a and 20b, voltages Vb corresponding to the voltage across resistor Ro2 are output to the microprocessor, and the microprocessor receives the voltages Vb and calculates the electric conductivity of water. In this case, the contact area is changed according to the amount of water supplied to the water tub because the electrode plates 10a and 10b are partially submerged, so the voltages Vb varied correspondingly to the change of the contact area are applied to the microprocessor.

The microprocessor is able to detect the water level of the water tub on the basis of the difference between the voltages Va detected by the reference electrode 10 and the voltages Vb detected by the measuring electrode 20. In such a case, it is important to note that errors of water level measurement can be eliminated despite the variation of the turbidity of water supplied to the water tub, since all the reference and measuring electrodes 10 and 20 detect the electric conductivity of water under the same conditions. That is, a measuring error can fundamentally be avoided by employing a relative water level measuring method using the reference and measuring electrodes 10 and 20.

The water level sensor of the present invention described above can be applied to a washing machine, a water purifier, humidifier, or the like. In this specification, the case where the water level sensor is applied to a washing machine is taken as an example.

Figure 4A:
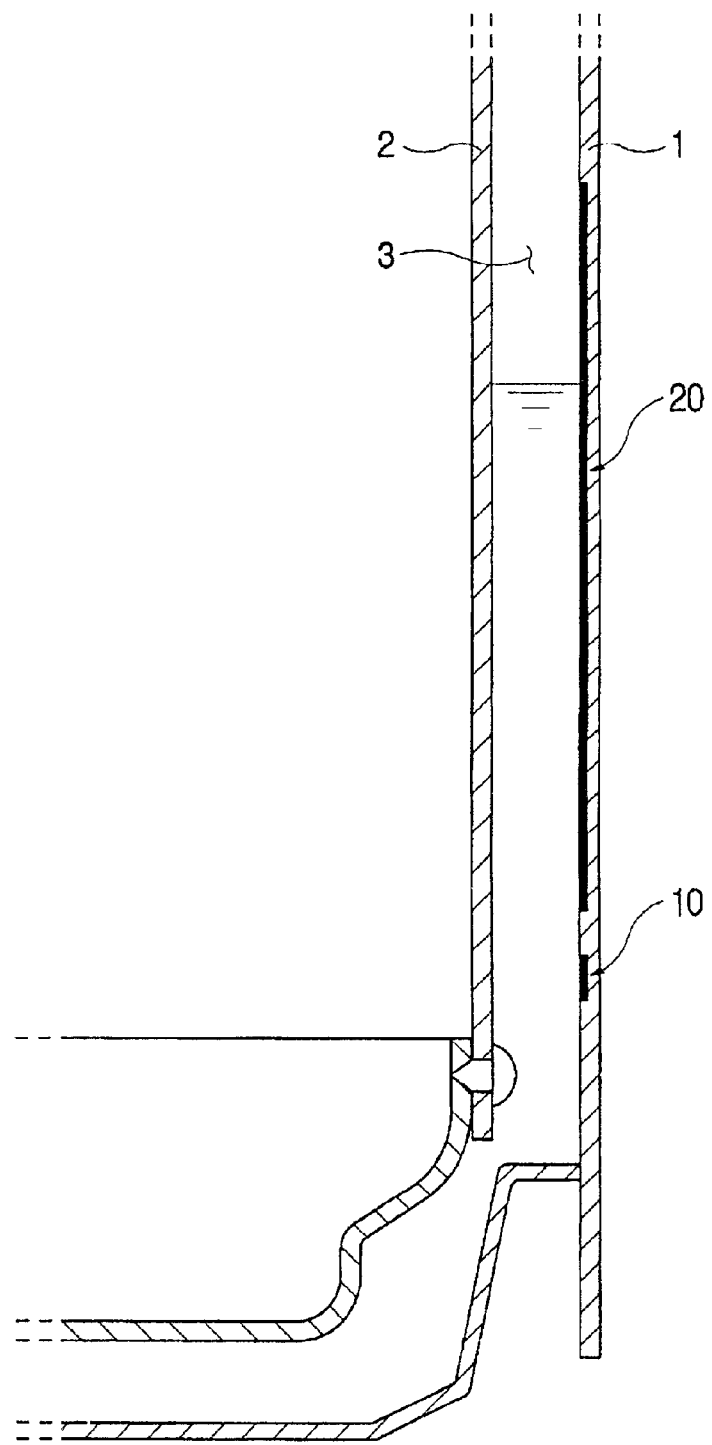
FIG. 4a is a cross section showing the electrodes of the water level sensor of the present invention embedded in the water tub of a washing machine.
Figure 4B:
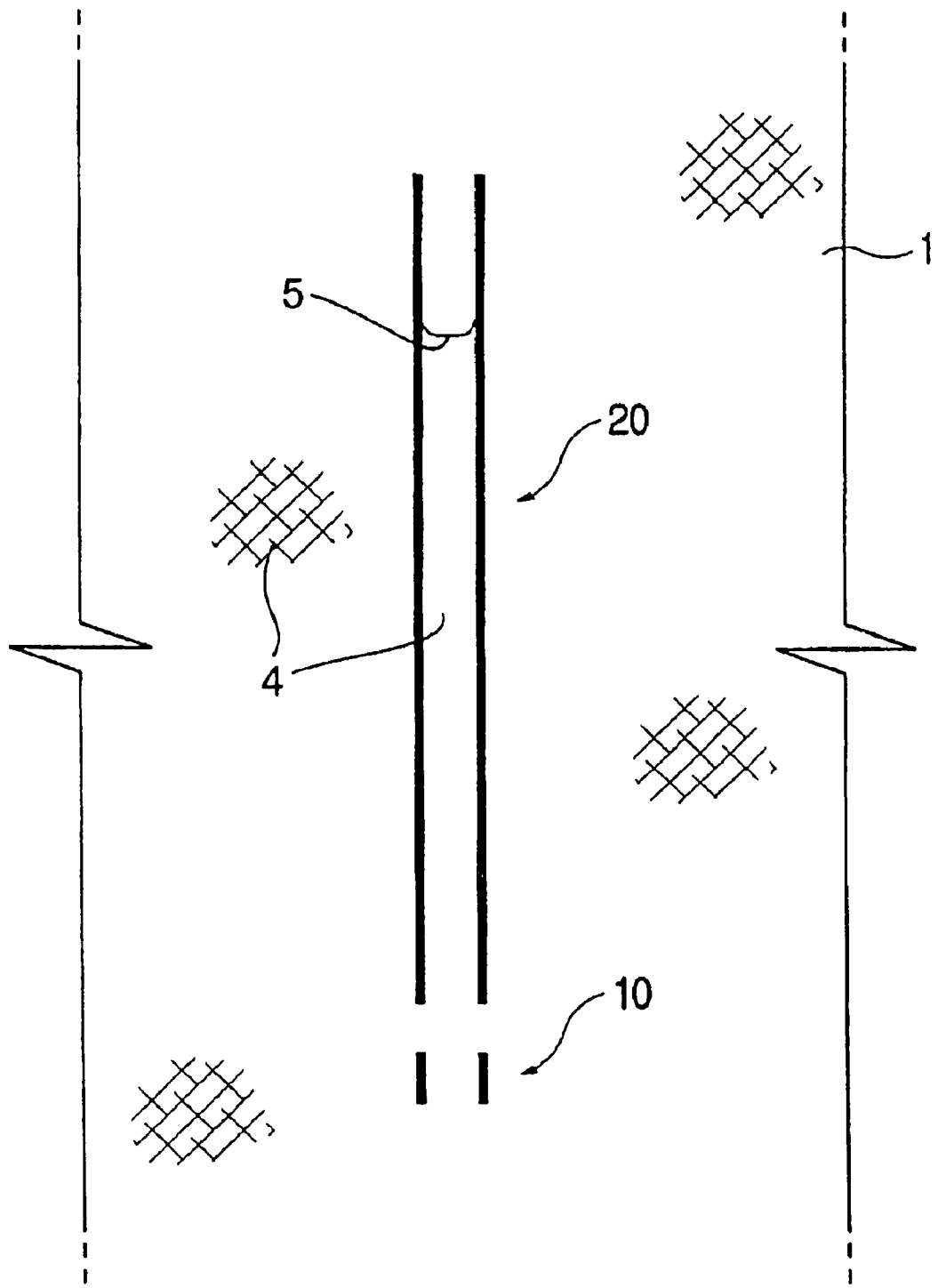
FIG. 4b is a front view showing the electrodes of the water level sensor of the present invention exposed to the interior of the water tub of a washing machine.

With reference to FIGS. 4a and 4b, the reference electrode 10 is positioned in the lower portion of the water tub 1, and the measuring electrode 20 is positioned in the water tub 1 to be upwardly spaced apart from the reference electrode 10. The measuring electrode 20 is extended from the low position of the water tub 1 to the high position of the water tub 1 to measure water levels ranging from a relatively low value to a relatively high value in consideration of guaranteeing a sufficient range of water level detection. Preferably, only turbid water 4 is between the plates of measuring electrode 20. The water level is indicated by the meniscus 5 above which is air.

Since the spin-drying tub 2 vibrates due to the imbalances occurring during a spin-drying operation, the reference and measuring electrodes 10 and 20 are embedded in the water tub 1 to avoid collision with the spin-drying tub 2. Additionally, it is preferable that the reference and measuring electrodes 10 and 20 are positioned to be exposed to a water storage space 3 so as to allow the surfaces of the reference and measuring electrodes 10 and 20 to come into contact with water filling the water storage space 3 and the board of an output circuit, etc. including a leading wire is positioned out of the water tub 1.

In addition, it is desirable to reduce power consumption by supplying predetermined direct currents to the reference and measuring electrodes 10 and 20 only when water level measurement is necessitated, or by periodically supplying direct currents to the reference and measuring electrodes 10 and 20.

Further, it is desirable to form a metallic coating on the surfaces of the electrode plates 10a, 10b, 20a and 20b of the reference and measuring electrodes 10 and 20 by plating them with metal such as gold, platinum, etc. so as to prevent the electrode plates 10a, 10b, 20a and 20b from being corroded by electrochemical reaction with impurities due to the exposure of the electrode plates 10a, 10b, 20a and 20b to water.

As described above, in accordance with the present invention, water levels can be precisely detected using the differences between the detection values of the reference and measuring electrodes in contact with water supplied to the water tub, so the water level sensor of the present invention can be effectively applied to a variety of apparatuses such as a washing machine, a water purifier, a humidifier, etc. that require precise water level detection. Additionally, the water level sensor of the present invention is capable of detecting water levels through a relative water level measuring method using the reference and measuring electrodes, so precise water level measurement can be achieved regardless of the turbidity of water. Further, the water level sensor of the present invention can prevent the damage of the electrodes due to corrosion by forming gold or platinum coating on the surfaces of the electrodes. In particular, when the water level sensor is applied to a washing machine, the water level sensor is capable of avoiding collision with the spin-drying tub in the manner of exposing the surfaces of the electrodes by embedding the electrodes in the water tub.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus comprising a water level sensor measuring a water level in a water tub, said apparatus comprising:
   a reference circuit, comprising a first reference electrode disposed between a first direct current source and a first resistor; and
   a measuring circuit, comprising a second reference electrode disposed between a second direct current source and a second resistor, said first electrode being disposed below said second electrode, said second electrode placed vertically inside said water tub so that a lower portion only of said second electrode is submerged in water and an entire portion of said first electrode is submerged in water during use of said water tub.

2. The apparatus of claim 1, further comprising a microprocessor measuring a voltage across said first resistor to calculate a conductivity of water in said water tub, said conductivity of said water in said water tub being dependent upon a turbidity of said water in said water tub, said conductivity of said water in said water tub being used by said microprocessor to calculate a water level in said tub by determining how much of said second electrode is immersed in water.

3. The apparatus of claim 1, said first and said second electrodes each being parallel conductive plates.

4. The apparatus of claim 3, each parallel plate being coated with gold to prevent corrosion.

5. The apparatus of claim 3, wherein turbid water within said water tub flows between the conductive plates of said first and said second electrodes.

6. The apparatus of claim 3, the parallel plates of said second electrode being larger than the parallel plates of said first electrode.

7. The apparatus of claim 1, said reference circuit and said measuring circuit each being absent alternating current and alternating voltages.

8. The apparatus of claim 1, said first and said second reference electrodes each serving as electrodes for resistive water in said tub and not serving as capacitors.

9. The apparatus of claim 1, said water being conductive, turbid water.

10. A water tub having a water level sensor, said water sensor comprising:
    a first circuit comprising a first set of parallel plates disposed in a bottom of said tub, said first set of parallel plates ordinarily having turbid water there between during use of said water tub, one plate of said first set of parallel plates being electrically connected to a first end of a first resistor, another plate of said first set of parallel plates being electrically connected to a first direct current voltage source, said direct current voltage source being electrically connected to a second end of said first resistor;
    a second circuit comprising a second set of parallel plates vertically in said tub and being disposed above said first set of parallel plates, said second set of parallel plates ordinarily having turbid water between a lower portion of said plates, one plate of said second set of parallel plates being electrically connected to a first end of a second resistor, another plate of said second set of parallel plates being electrically connected to a second direct current voltage source, said second direct current voltage source being electrically connected to a second end of said second resistor; and
    a microprocessor electrically connected to said first and said second circuits, said microprocessor determining a conductivity of water in said tub by sensing a voltage across said first resistor, said microprocessor determining a water level in said water tub by sensing a voltage across said second resistor.

11. The sensor of claim 10, said second set of parallel plates being larger than said first set of parallel plates.

12. The sensor of claim 10, said first and said second circuit being absent alternating current and alternating voltages.

13. The sensor of claim 10, said first and said second set of parallel plates serving as electrodes for resistive water in said tub and not serving as capacitors.

14. A method for measuring a water level in a water tub, comprising the steps of:
    partially filling said water tub with turbid water, said water completely immersing a first set of parallel plates and partially immersing a second set of parallel plates;
    determining a conductivity of said turbid water by applying a direct current through said first set of parallel plates; and
    determining a water level of said turbid water in said water tub by measuring a direct current through said second set of parallel plates.

15. The method of claim 14, wherein no alternating current or alternating voltages are applied to either said first or said second set of parallel plates.

16. The method of claim 14, wherein said first and said second set of parallel plates serve as electrodes for resistive water in said tub and not as capacitors.

17. The apparatus of claim 1, said second electrode being distinguishable from said first electrode and said second direct current source being distinguishable from said first direct current source.

18. The method of claim 14, said second set of parallel plates being distinguishable and separate from said first set of parallel plates.

19. The apparatus of claim 3, wherein only said water in said tub is between said parallel conductive plates of said first and said second electrodes.

20. The water sensor of claim 10, wherein only said turbid water is between said second set of parallel plates.

21. The method of claim 14, said determining a conductivity step being a calibration for said determining a water level step.

22. The method of claim 14, said water level being determined by measuring only a direct current through said second set of parallel plates.

* * * * *